United States Patent [19]

Zyngier

[11] Patent Number: 4,527,834
[45] Date of Patent: Jul. 9, 1985

[54] ADJUSTABLE HEADREST

[75] Inventor: John F. Zyngier, Warren, Mich.

[73] Assignee: General Motors Corporation, Detroit, Mich.

[21] Appl. No.: 403,557

[22] Filed: Jul. 30, 1982

[51] Int. Cl.³ .............................................. A47C 7/36
[52] U.S. Cl. .................................. 297/410; 248/414; 297/391
[58] Field of Search ....................... 297/410, 437, 391; 248/161, 411, 412, 414; 403/52, 109, 112

[56] References Cited

U.S. PATENT DOCUMENTS

| 909,223 | 1/1909 | Reynolds | 248/412 |
| 1,795,747 | 3/1931 | Viken | 248/411 |
| 2,711,475 | 6/1955 | Chadwick et al. | 248/414 X |
| 4,427,233 | 1/1984 | Matumoto | 297/410 X |

FOREIGN PATENT DOCUMENTS

| 344664 | 11/1921 | Fed. Rep. of Germany | 248/161 |
| 2200282 | 2/1979 | Fed. Rep. of Germany | 297/410 |

Primary Examiner—William E. Lyddane
Assistant Examiner—Peter R. Brown
Attorney, Agent, or Firm—Charles E. Leahy

[57] ABSTRACT

The headrest is adjustably mounted by a molded plastic guide inserted through an aperture in the mounting bracket concealed in the seat back and having a central bore for receiving a support post of the headrest. Longitudinally extending slots communicate with the central bore to define a plurality of circumferentially spaced radially yieldable flexure fingers. An abutment is carried by at least one of the flexure fingers and includes a ramp which momentarily deflects the flexure finger radially inward upon insertion of the plastic guide through the mounting bracket aperture and a shoulder which engages with the mounting bracket to retain the plastic guide in the mounting bracket. A spring bears radially inward upon at least one of the flexure fingers to urge frictional engagement with the support post and establish the support post at a desired vertically adjusted position. The support post has a necked down central portion defining an upwardly facing stop face. A flange molded integrally with the plastic guide overlies the top of the seat back and defines a recess opening which cages a retainer spring seating within the necked down central portion of the support post for engagement by the upward facing stop face to limit the upward adjusting movement of the headrest.

1 Claim, 6 Drawing Figures

ADJUSTABLE HEADREST

The invention relates to an adjustable headrest for a vehicle seat back and more particularly provides a molded plastic guide which mounts the headrest support bar within the seat back and frictionally impedes adjusting movement to maintain a desired position.

BACKGROUND OF THE INVENTION

It is well known in motor vehicle seats to provide a headrest at the top of the seat back for occupant safety and comfort. It is also known to mount the headrest via one or more support posts which extend downwardly into the top of the seat back and are mounted therein by mechanism by which the height of the headrest may be adjusted.

SUMMARY OF THE INVENTION

The invention provides a new and improved headrest including a molded plastic guide which is adapted for insertion through an aperture of the mounting bracket concealed in the seat back. The molded plastic guide has a tubular body with a central bore therethrough adapted to receive the support post of the headrest. Longitudinally extending slots are provided in the tubular body and communicate with the central bore to define a plurality of circumferentially spaced radially yieldable flexure fingers integral with the tubular body. An integral abutment is carried by at least one of the flexure fingers and includes a ramp which momentarily deflects the flexure finger radially inward upon insertion of the plastic guide through the mounting bracket aperture and a shoulder which is adapted to engage with the mounting bracket subsequent to radially outward flexure of the flexure finger to its normal position so that the shoulder retains the plastic guide in the mounting bracket. Furthermore, insertion of the support post through the central bore blocks any subsequent radial inward flexure of the flexure finger. A spring encircles the tubular body and has ends seated within the longitudinal extending slots and a central portion bearing upon one of the flexure fingers to urge radial inward movement and frictional engagement of the flexure finger with the support post to frictionally establish the support post at a desired adjusted position. The support post has a necked down central portion defining an upwardly facing stop face. A flange molded integrally with the plastic guide overlies the top of the seat back and defines a recess opening which cages a retainer spring seating within the necked down central portion of the support post for engagement by the upward facing stop face to limit the upward adjustng movement of the headrest.

The object, feature and advantage of the invention resides in the provision of a tubular plastic guide for insertion through the apertured mounting bracket of a seat back and having an integral flexure finger with an abutment adapted to engage the mounting bracket to prevent removal of the plastic guide from the seat back.

A further object, feature and advantage of the invention resides in the provision of molded plastic tubular guide having a plurality of circumferentially spaced radially yieldable flexure fingers and a spring adapted to urge at least one of the flexure fingers radially inward for frictional engagement with the headrest support post to maintain headrest at a desired adjusted position in the seat back.

A further object, feature and advantage of the invention resides in the provision of a tubular guide having a flange overlying the seat back and defining an opening communicating with a support post receiving bore therethrough to cage a retainer spring adapted to seat within a necked down central portion of the support post to effectively define the limits of vertical adjusting movement of the support post relative the seat back.

DESCRIPTION OF THE DRAWINGS

These and other objects, features and advantages of the invention will become apparent upon consideration of the specification and the appended drawings in which.

DESCRIPTION OF THE PREFERRED EMBODIMENT

Figure 1:
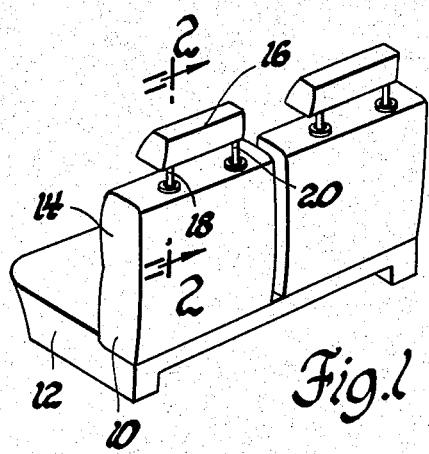
FIG. 1 is a perspective view of a vehicle seat having a headrest according to the invention.

Referring to FIG. 1 there is shown a vehicle seat 10 including a seat bottom 12 and a seat back 14. A padded headrest assembly 16 is mounted on the seat back 14 by support posts 18 and 20.

Figure 2:
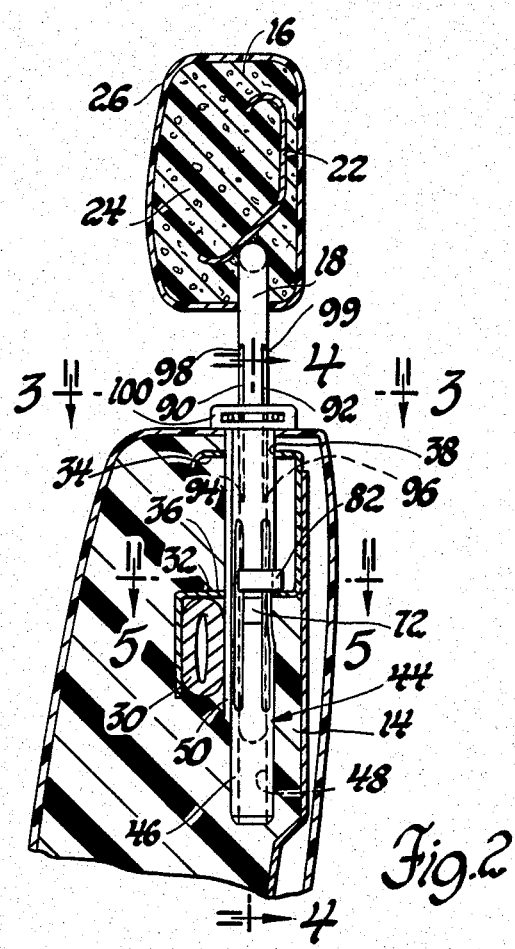
FIG. 2 is a sectional view taken in the direction of arrows 2—2 of FIG. 1.
Figure 4:
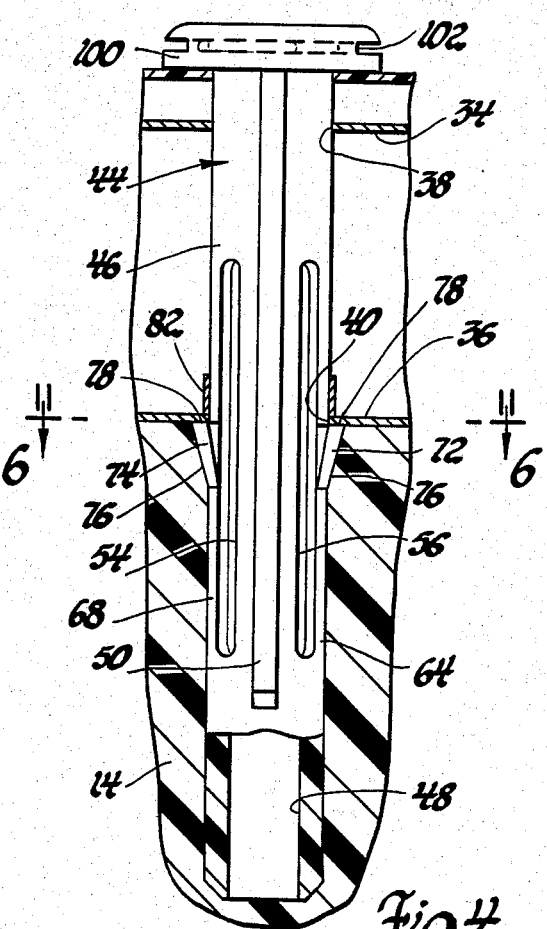
FIG. 4 is a sectional view taken in the direction of arrows 4—4 of FIG. 2.

Referring to FIG. 2 it is seen that the headrest assembly 16 includes a frame 22 which carries a foam cushion 24 enclosed within a cover 26. The support post 18 is welded or otherwise suitably attached to the frame 22 and extends downwardly into the seat back 14. The seat back 14 includes a flattened tubular frame 30 upon which a mounting bracket 32 is mounted. The mounting bracket 32 includes vertically spaced apart upper wall 34 and lower wall 36 which have aligned apertures 38 and 40 as best seen in FIG. 4.

A moled plastic guide 44 is provided for insertion through the apertures 38 and 40 of the mounting bracket 32. The plastic guide 44 includes a tubular body 46 having a central bore 48 extending longitudinally therethrough. As thus seen in FIGS. 4, 5 and 6 a longitudinally extending lug 50 projects from the tubular body 46 and mates with a slot 52 of the mounting bracket lower wall 36 and a similar slot of the upper wall 34 to fix the plastic guide 44 against rotation within the mounting bracket 32. Tubular body 46 also has circumferentially spaced longitudinally extending slots 54, 56, 58 and 60 which communicate with the central bore 48 and define radially spaced flexure fingers 64, 66 and 68. As best seen in FIGS. 4 and 6, abutments 72 and 74 are molded integral with the flexure fingers 64 and 68 and each has a ramp surface 76 and a shoulder 78.

Referring again to FIG. 4, it will be understood that the plastic guide 44 is installed into the seat back 14 by the insertion of the tubular body 46 downwardly through the aligned apertures 38 and 40 of the mounting bracket upper and lower walls 34 and 36. Upon such insertion, the ramp surfaces 76 of the abutments 72 and 74 coact with the mounting bracket apertures 38 and 40 to cause a radial inward deflection of the flexure fingers 64 and 68. Upon reaching the fully inserted position of FIG. 4, the shoulders 78 of the abutments 74 and 76 engage with the underside of the mounting bracket lower wall 36 to effectively retain the plastic guide 44 within the seat back.

Figure 5:
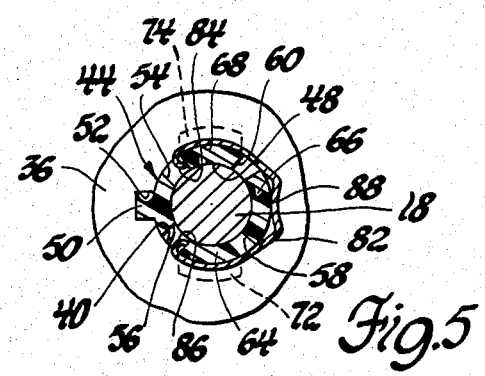
FIG. 5 is a sectional view taken in the direction of arrows 5—5 of FIG. 2.
Figure 6:
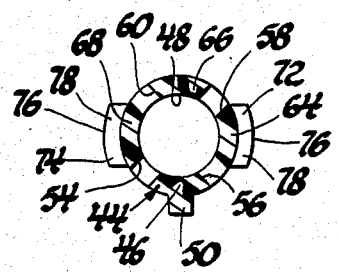
FIG. 6 is a sectional view taken in the direction of arrows 6—6 of FIG. 4.

Referring to FIGS. 2 and 5, it is seen that a spring 82 encircles the tubular body 46 and has curled ends 84 and 86 which extend within the slots 54 and 56 and seat against the flexure fingers 64 and 68. The spring 80 also has an inwardly bent portion 88 which bears upon the flexure finger 66 and yieldably deflects the flexure finger 66 radially inward to partially obstruct the central bore 48.

Referring again to FIG. 2, it is seen that the support post 18 of the headrest is inserted through the central bore 48 of the tubular body 46. The radially inward bias of the flexure finger 66 by the spring 82 establishes a frictional engagement which impedes the vertical movement of the support post 18 within the plastic guide 44 so that the headrest 16 is maintained at its desired vertically adjusted position.

Figure 3:
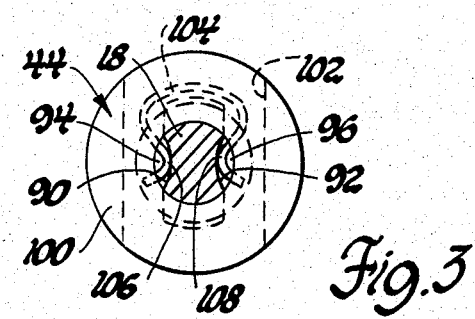
FIG. 3 is a sectional view taken in the direction of arrows 3—3 of FIG. 2.

Referring to FIGS. 2 and 3, it is seen that the cross-section of the support post 18 is necked down along a central portion of its length by the provision of arcuate opposed facing recesses 90 and 92 which define upward facing stop faces 94 and 96 and downward facing stop faces 98 and 99. As best seen in FIG. 4, a flange 100 is molded integrally at the top of the plastic guide 44 and has a recessed slot opening 102 extending horizontally therethrough. A hairpin shaped retainer spring 104, FIG. 3, is caged within the recessed slot opening 102 and has spaced apart legs 106 and 108 which are engaged within the arcuate recesses 90 and 92 of the support post 18 to provide snap retention of the retainer spring 104 within the slot 102. Upon upward movement of the headrest 16, the upward facing stop faces 94 and 96 of the post 18 will be carried into engagement with the legs 106 and 108 of the spring 104, thereby preventing the removal of the headrest 16 from the seat back 14 by limiting the upward adjusting movement. Downward adjusting movement is limited by the engagement of the downward facing stop faces 98 and 99 with the legs 106 and 108 of the retainer spring 104 or by engagement of the headrest 16 with the seat back. Accordingly, the vertical extent of the necked down portion defines the range of permissible vertical adjusting movement of the headrest.

If it is necessary to remove the headrest for maintenance or service, the spring retainer 104 may be removed from the slot 102 of the plastic guide 44 to enable unlimited upward movement of the support post 18.

Thus, it is seen that the invention provides a new and improved retention and adjustment arrangement for a verticaly movable vehicle seat back headrest.

The embodiments of the invention in which an exclusive property or privilege is claimed are defined as follows:

1. An adjusting headrest for a vehicle seat back having an apertured mounting bracket comprising:

a molded plastic guide adapted for insertion through the aperture of the mounting bracket and having a tubular body with a central bore therethrough, at least four of longitudinal extending circumferentially spaced slots through the tubular body communicating with the central bore to define at least first, second and third longitudinally coincident circumferentially spaced yieldable flexure fingers integral with the tubular body, at least the first and second of the flexure fingers being diametrically opposed from each other and having the third flexure finger disposed therebetween, integral abutment means carried by the first and second flexure fingers and adapted to coact with the mounting bracket in a manner to deflect said first and second flexure fingers radially inward upon insertion of the plastic guide through the mounting bracket aperture so that the abutment means is inserted through the aperture of the mounting bracket;

a support post connected to the headrest and adapted to extend through the bore of the plastic guide and limit radially inward flexure of said first and second flexure fingers to effectively maintain the abutment means in engagement with the mounting bracket to prevent removal of the plastic guide from the mounting bracket; and spring means adapted to encircle the tubular body and said first, second and third flexure fingers and having curled ends seated respectively in a pair of said longitudinally extending slots disposed generally opposite of said third flexure finger, said spring means having a central inwardly bent portion bearing on said third flexure fingers to urge said third flexure finger radially inward into frictional engagement with the support post to frictionally impede movement of the support post within the seat back whereby the headrest is frictionally maintained at a desired position.

* * * * *